(12) United States Patent
Earle et al.

(10) Patent No.: US 7,781,625 B2
(45) Date of Patent: Aug. 24, 2010

(54) PROCESS CATALYSED BY BIS-TRIFILMIDE COMPOUNDS

(75) Inventors: Martyn J. Earle, Belfast (GB); Barry Joseph Mcauley, Co Antrim (GB); Alwar Ramani, Belfast (GB); Kenneth Richard Seddon, Co Down (GB); Jillian M. Thomson, Co Antrim (GB)

(73) Assignee: The Queen's University of Belfast, Belfast (GB)

( * ) Notice: Subject to any disclaimer, the term of this patent is extended or adjusted under 35 U.S.C. 154(b) by 1381 days.

(21) Appl. No.: 10/471,259

(22) PCT Filed: Mar. 12, 2002

(86) PCT No.: PCT/GB02/00988

§ 371 (c)(1), (2), (4) Date: Apr. 22, 2004

(87) PCT Pub. No.: WO02/072519

PCT Pub. Date: Sep. 19, 2002

(65) Prior Publication Data

US 2004/0171895 A1      Sep. 2, 2004

(30) Foreign Application Priority Data

Mar. 12, 2001 (GB) ................................. 0106000.3
Mar. 12, 2001 (GB) ................................. 0106001.1

(51) Int. Cl.
C07F 5/00     (2006.01)

(52) U.S. Cl. ........................................ 570/143; 534/15

(58) Field of Classification Search ................ 570/143
See application file for complete search history.

(56) References Cited

U.S. PATENT DOCUMENTS

| 3,098,099 | A | * | 7/1963 | Conte, Jr. et al. | ............ | 568/310 |
| 5,824,832 | A | * | 10/1998 | Sherif et al. | ................ | 585/455 |
| 5,852,207 | A | * | 12/1998 | John et al. | .................. | 560/155 |
| 5,965,054 | A | * | 10/1999 | McEwen et al. | ........... | 252/62.2 |

FOREIGN PATENT DOCUMENTS

| EP | 1 122 239 A2 | 8/2001 |
| EP | 1 122 240 A2 | 8/2001 |
| EP | 1 201 G34 A1 | 5/2002 |

(Continued)

OTHER PUBLICATIONS

Marx, A. and Yammamoto, "Aluminum Bis(trifluoromrthylsulfonyl) amides: Highly Effective and Remarkably Versatile Catalysts for C-C Bond Formation Reactions," Angew. Chem Int. Ed., 2000, pp. 178-181, vol. 39, Num.1, Wiley-VCH, Weinheim, Germany.*

(Continued)

*Primary Examiner*—Melvin C Mayes
*Assistant Examiner*—Stefanie Cohen
(74) *Attorney, Agent, or Firm*—Hodgson Russ LLP

(57) ABSTRACT

A process for carrying out a chemical reaction which is catalysed by one or more metal or hydrogen fluoroalkyl-sulfonylated compound which process comprises carrying out said reaction in the presence of an ionic liquid or in solvent-free conditions.

43 Claims, 4 Drawing Sheets

FOREIGN PATENT DOCUMENTS

| | | |
|---|---|---|
| EP | 1201634 A1 | 5/2002 |
| JP | 07 246338 | 9/1995 |
| JP | 09 176171 | 7/1997 |
| JP | 09 188683 | 7/1997 |
| JP | 917 6063 | 7/1997 |
| JP | 924 1184 | 9/1997 |
| JP | 2001-32046 | 10/2001 |
| WO | 97/23448 | 7/1997 |
| WO | 98/21197 | 5/1998 |
| WO | WO 98/21197 | 5/1998 |
| WO | WO 98/29388 | 7/1998 |
| WO | 99/37655 | 7/1999 |
| WO | 99/40025 | 8/1999 |
| WO | WO 99/40025 | 8/1999 |
| WO | WO 99/40124 | 8/1999 |
| WO | WO 01/12322 | 2/2001 |

OTHER PUBLICATIONS

Wasserscheid, Peter et al, ionic Liquids- New "Solutions" for transition metal catalysis, 2000, Angewante, Chem. Int. Ed. 39, pp. 3772-3789.*

Earle, Martyn et al, Ionic liquids. Green solvents for the future, 2000, Pure Appl. Chem., vol. 72, No. 7, pp. 1391-1398.*

K.Mikami et al; Metal Bis (trifluoromethylsulfonyl) Amides As Highly Efficient Lewis Acid Catalysts for Acylation; Synlett; 1966.

K.Ishihara et al; Scandium Trifluoromethanesulfonimide and Scandium Trifluoromethane sulfonate As Extremely Active Acetalization Catalysts; Synlett; 1996.

P. Grieco et al.; Magnesium Trifluoromethanesulfonimide (Triflimide) Promoted Substitution Reactions of Allylic and Benzylic Acetates Magnesium Triflimide As a Substitute for Magnesium Pevchlorate; Tetrahedron Letters; 1997.

M. Earle et al; Diels-Alder Reactions in Ionic Liquids; Green Chemistry; 1999.

Mikami, K., et al., "Synthesis, structure and high catalytic activity in the Diels-Alder reaction of ytterbium (III) and yttrium (III) bis(trifluoromethanesulfonyl) amide complexes," Inorganic Chemistry Communications, 1998, pp. 10-11, vol. 1, Elsevier Science S.A.

Polyakov, O. G., et al., "Cu(CO)2(N(SO2CF3)2. The First Structurally Characterized Copper (I) Polycarbonyl," Organometallics, Sep. 13, 1999, pp. 3769-3771, vol. 18, No. 19, American Chemical Society.

Marx, A. and Yamamoto, H., "Aluminum Bis(trifluoromethylsulfonyl)amides: New Highly Efficient and Remarkably Versatile Catalysts for C-C Bond Formation Reactions," Angew. Chem. Int. Ed., 2000, pp. 178-181, vol. 39, No. 1, Wiley-VCH, Weinheim, Germany.

Mikami, K., et al., "Lanthanide Bis-trifluoromethanesulfonylamides as a New Type of Asymmetric Catalysts for Hetero Diels-Alder Reaction with Danishefsky's Diene in the Presence of Water," Synlett, Sep. 1995, pp. 975-977, vol. 95, No. 9, Thieme International, Stuttgart, Germany.

Grieco, P. A. and Handy, S. T., "Magnesium Trifluoromethanesulfonimide(Triflimide) Promoted Substitution Reactions of Allylic and Benzylic Acetates. Magnesium Triflimide as a Substitute for Magnesium Perchlorate," Tetrahedron Letters, 1997, pp. 2645-2648, vol. 38, No. 15, Elsevier Science Ltd., Great Britain.

* cited by examiner

PROCESS CATALYSED BY BIS-TRIFILMIDE COMPOUNDS

The present invention relates to a process for carrying out a chemical reaction which is catalysed by bis-triflimide and related bis-trifilimide compounds. More specifically, the present invention relates a process for carrying out such chemical reactions in the presence of an ionic liquid or in solvent-free conditions.

The catalysis of chemical reactions is of major importance in chemistry. The salts of certain metals are known to act as Lewis acids (electron pair acceptors), which interact with the reactants (and products) of a reaction, producing a reaction rate enhancement and/or selectivity enhancement. Also salts of metals which can exist in variable oxidation states (such as transition metals) are known to catalyse chemical reactions such as Friedel-Crafts, oxidation, reduction, Diels-Alder, isomerisation, coupling, addition and elimination reactions. The Friedel-Crafts reaction is often used to functionalise aromatic rings. The reaction involves the interaction of an acylating or alkylating agent such as benzoyl chloride or benzyl chloride with an aromatic compound such as benzene to give the products, in this case, benzophenone and diphenylmethane. The reaction requires a Lewis acid catalyst such as aluminium(III) chloride. The reaction suffers from a major disadvantage in that, particularly with acylation reactions, at least one molar equivalent of Lewis acid catalyst is needed. The work-up of these reactions results in the destruction of the catalyst and can produce considerable amounts of acidic aqueous waste. There is a need for an improved catalyst system which requires less catalyst, produces less waste and allows for the catalyst to be reused and recycled.

Metal bis-triflimides are known as catalysts for some reactions. Examples include polymerisation of styrene with titanium (or zirconium) bis-triflimides in the solvent toluene. Magnesium bis-triflimide has been used for the reaction of silyl-enol ethers or silyl-ketene acetals with allylic or benzylic acetates in the solvent dichloromethane. Scandium bis-triflimide has been used as a catalyst for the formation of acetals and ketals from carbonyl compounds (or enol ethers) in the solvent dichloromethane. Aluminium, ytterbium and titanium bis-triflimides have been used in the reaction of acetic anhydride with anisole or diphenyl ether to give acetyl anisole or 4-phenoxyacetophenone respectively. These reactions are carried out in the dangerous and explosive solvent, nitromethane. Such a procedure is of very limited benefit as aromatics less reactive than anisole would require elevated reaction temperatures and can only be carried out on a small scale due to the inherent explosion risk. There is therefore a need for a reaction system that does not require the use of explosive solvents such as nitromethane or toxic solvents such as toluene or dichloromethane.

The present invention solves the problems of the prior art by providing a process for carrying out a chemical reaction which is catalysed by one or more metal or hydrogen fluoralkylsulfonated compound which process comprises carrying out said reaction in the presence of an ionic liquid or in solvent-free conditions.

Suitably the chemical reaction is an aromatic electrophillic substitution reaction such as the reaction of an aromatic compound and an alkylating, acylating or sulfonating agent to give an arylalkane, aryl ketone or sulfone. The reaction may be a Friedel-Crafts acylation, Friedel-Crafts alkylation or a sulfonylation. The reaction may be the reaction of acid halides, anhydrides or carboxylic acids with aromatic compounds to give an aryl ketone. The reaction can be a reaction of sulfonyl halides, sulfonic anhydrides or sulfonic acids with aromatic compounds to give a sulfone. The reaction may be a reaction of alkenes with aromatic compounds to give aryl alkanes. The reaction may also be a bis-triflimide compound catalysed or promoted isomerisation, polymerisation or rearrangement of chemical compounds or molecules. The reaction may be a rearrangement of esters of phenols to acyl phenols (Fries rearrangement). The reaction may be a dimerisation (or oligiomerisation or polymerisation) of alkenes to give dimerised alkenes (or oligomerised or polymerised alkenes). The reaction can be the migration or isomerisation of carbon-carbon double bonds in unsaturated compounds. The reaction can be an hydration, nitration, carbon-carbon bond forming reaction, halogenation, oxidation or reduction reaction. A general reaction scheme for the reactions catalysed using metal bis-triflimides is shown below:

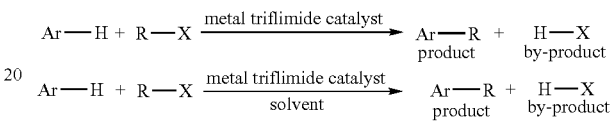

where Ar=aromatic group, R=alkyl, acyl, alkylsulfonyl, arylsulfonyl. X=Cl, OH, Br, I, F, OR, SH, $NR_2$, $OSO_2R$, $O_2CR$ or other leaving group.

By metal or hydrogen fluoroalkylsulfonylated compound is mea a compound derived from a metal or hydrogen cation and $[N(SO_2C_xF_{(2x+1)})_2]^-$ anion. For example, the catalyst can be any compound containing a metal and a fluorinated-alkylsulfonylated anion (preferably a fluorinated-alkylsulfonylamine anion). The one or more metal or hydrogen fluoroalkylsulfonylated compound is preferably a metal or hydrogen bistriflimide. By bis-triflimide compound is meant any compound which comprises the ion $[N(SO_2CF_3)_2]^-$. This ion is commonly known by the following names: triflimide, bis(trifluoromethanesulfonyl)amide, bis-trifluoromethanesulfonimide, bis(trifluoromethanesulfonyl)imide, trifluoromethanesulfonimide. In this document, the term bis-triflimide will be used as the name for the $[N(SO_2CF_3)_2]^-$ ion. Also, the abbreviation $[NTf_2]$ is sometimes used to represent the $[N(SO_2CF_3)_2]^-$ ion. Preferably the bis-triflimide compound is a metal bis-triflimide catalyst or hydrogen bis-triflimide $HN(SO_2CF_3)_2$. The formula of the hydrogen and metal bistriflimide catalyst is

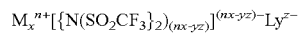

where M is a hydrogen or a metal;

L is a negative or neutral ligand;

n is 2, 3, 4, 5, 6, 7 or 8;

x is greater than or equal to 1 y is 0, 1, 2, 3, 4, 5, 6, 7 or 8; and z is 0, 1, 2, 3 or 4.

M may represent more than one type of metal ion. M is preferably a metal selected from the metals in groups 1 to 16 of the periodic table and the lanthanides and the actinides. By group 8 is meant the group containing Fe, Ru, Os, Hs, by group 9 is meant the group containing Co, Rh, Ir, Mt, etc. L may be selected from oxos (such as $VO^{2+}$), phosphines (such as triphenylphosphine), water, halides or ketones. The ligand may originate from a solvent, reagent or by-product in the reaction mixture for making the catalyst or the reaction mixture in which the catalyst is used.

The metal or metals may possess one or more neutral or negative ligands (such as triphenylphosphine or oxo (such as in $VO_2^+$)) or any other ligand such as as oxo, phosphines, water, halide or ketones. Preferably the metal or metals are preferably, but not exclusively, a transition metal, lanthanide or actinide, group 2 (Be, Mg, Ca, Sr, Ba), Group 11 (Cu, Ag, Au), Group 12 (Zn, Cd, Hg) Group 13 (B, Al, Ga, In, Tl), Group 14 (Si, Ge, Sn, Pb), Group 15 (P, As, Sb, Bi), Group 16 (S, Se, Te, Po). Preferably the metal or metals are preferably, but not exclusively in the +2 oxidation state (eg $Co^{2+}$), in the +3 oxidation state (eg $Al^{3+}$) or in the +4 oxidation state (eg $Ce^{4+}$). Cationic species containing charged ligands could also be used (eg $UO_2^{2+}$, $VO^{2+}$). Monovalent, pentavalent, heptavalent and hexavalent cationic species may also be used. Particularly preferred metal bis-triflimide compounds which have been prepared and isolated for use in the catalytic reactions of the present invention include magnesium bis-triflimide, calcium bis-triflimide, strontium bis-triflimide, barium bis-triflimide, aluminium bis-triflimide, gallium bis-triflimide, indium bis-triflimide, scandium bis-triflimide, yttrium bis-triflimide, lanthanum bis-triflimide, cerium bis-triflimide, ytterbium bis-triflimide, chromium bis-triflimide, manganese bis-triflimide, iron bis-triflimide, cobalt bis-triflimide, nickel bis-triflimide, copper bis-triflimide, zinc bis-triflimide, silver bis-triflimide, cadmium bis-triflimide, tin bis-triflimide, lead bis-triflimide, and bismuth bis-triflimide.

Typically, the reactions of the present invention require an amount of bis-triflimide compound is between 0.000001 and 1000 mol %, typically this is between 0.1 and 10 mol %, preferably it is between 0.5 and 5 mol % and more preferably this is between between 0.5 and 2 mol %.

The process may involve the addition of the bis-triflimide catalyst to the reactants, e.g. the addition of 1 mol % of $Zn(NTf_2)_2$ to a mixture of an alkylating agent or acylating agent or sulfonylating agent and aromatic compound. This can be carried out either in the presence of an ionic liquid or in solvent-free conditions. When carried out in the presence of an ionic liquid, the catalyst may be dissolved or suspended in an ionic liquid. An ionic liquid is a molten salt that is in a liquid state at the reaction temperature and usually (but not essentially) molten at or near room temperature, i.e, 20° C. When carried out in solvent-free conditions, the catalyst may be soluble, or partially soluble, in the reactants or products (these can act as both solvent and reagent). The products can be separated from the catalyst at the end of the reaction by distillation or solvent extraction with a solvent that the catalyst is insoluble in (for example cyclohexane).

An ionic liquid is a molten salt or mixture of salts that is in the liquid state at the temperature of the reaction. The ionic liquids (if used) are preferably molten salts that are in the liquid state at ambient temperatures, and preferentially dissolve the catalyst when contacted with the reagents. Preferably the catalyst is soluble in the ionic liquid to a much greater extent that the products and/or reactants during the separation of the catalyst from the products/reactants. The ionic liquid consists of two components, which are a positively charged cation and a negatively charged anion. Preferably the cation is an organic cation and the anion is an organic or inorganic anion. That cation for the process is preferably a 1-alkylpyridinium (such as 1-hexylpyridinium) or 1,3-dialkylimidazolium cation such as 1-butyl-3-methylimidazolium [bmim] or 1-ethyl-3-methylimidazolium [emim]. Other cations for this process are other alkyl- or poly-alkylpyridinium, alkyl or poly-alkylimidazolium, alkyl or poly-alkylpyrazolium, alkyl or poly-alkyl ammonium, alkyl or poly-alkyl phosphonium, other ammonium, phosphonium cations, alkylated diazabicyclo-[5,4,0]-undec-7-ene and related cations, or any other cation that gives rise to compounds termed ionic liquids. The anion for the process is preferably one that is stable to chemical alteration during the reaction and imparts desirable physical characteristics to the ionic liquid. Some suitable anions for the ionic liquid are bis-trifluoromethanesulfonimide, bis-pentafluoroethanesulfonimide, hexafluorophosphate(V), tetrafluoroborate(III), trifluoromethanesulfonate, cyanamide, fluoro or perfluoroalkylsulfonate, halide, sulfate, hydrogensulfate, alkylsulfate, alkylsulfonate, arylsulfate, arylsulfonate, nitrate, carboxylate, phosphate, hydrogenphosphate, dihydrogenphosphate, alkylphosphate, alkylphosphonate, phosphonate, nitrite, arsenate, antimonate, haloaluminate, aluminate, borate, silicate, haloindate(III), gallate, alkylborate, halogallate or any other anion that gives rise to an ionic liquid.

Examples of ionic liquids are given below:

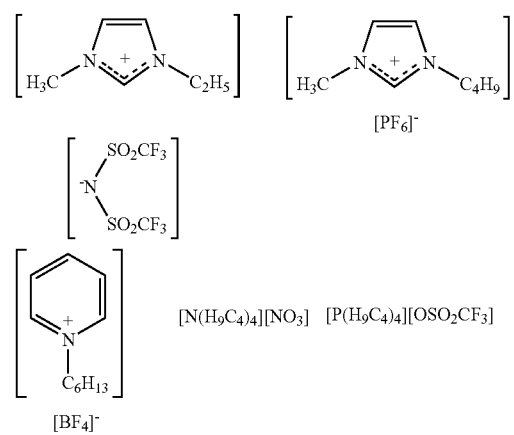

Preferably the ionic liquid or the catalyst or the ionic liquid and catalyst combination is insoluble in low- or non-polar organic solvents such as diethyl ether or hexane.

In addition to ionic liquids being excellent media for the execution of the Friedel-Crafts and other reactions, a second major benefit of this invention is that the catalyst and ionic liquid can be recycled and reused in many reactions. This means that catalysts are not lost. This is an improvement over reactions performed in nitromethane, which is an explosive solvent and is hard to recycle.

The chemical reactions of the present invention may be carried out at temperatures between temperatures of from −100° C. to 450° C. Preferably the reaction is performed at a temperature between 20° C. and the boiling point of the reactants.

The present invention further provides a process whereby the bis-triflimide catalyst or related fluoroalkylsulfonylated compound may be generated in situ by the addition of a metal or a metal compound (for example, a metal halide) to a bis-triflimide salt (or other bis-triflimide compound) or related fluoroalkylsulfonylated compound. This process can be carried out in the absence of a solvent or in an ionic liquid. An example of this would be the addition of a metal salt to a bis-triflimide ionic liquid (or hydrogen bis-triflimide to an ionic liquid) to generate a catalyst that is capable of catalysing the desired chemical reaction. This can be achieved by taking a metal or metal compound, not necessarily a bis-triflimide salt (for example a metal halide such as, $ZnCl_2$ or $SnCl_4$), and dissolving (reacting) it in a bis-triflimide ionic liquid or other source of bis-triflimide (for example, $HN(SO_2CF_3)_2$). A suitable source of bis-triflimide ions is [emim] [$NTf_2$]. To this combination, the reactants, e.g. alkylating, acylating or sulfonating agent and aromatic compound can be added, with heating if necessary. The products can be separated from the catalyst at the end of the reaction by distillation or solvent extraction with a solvent in which, for example, the catalyst and ionic liquid combination are insoluble (for example, cyclohexane).

After the reaction of the present invention, the catalyst may be separated from the products/remaining reactants. Preferably the separation process does not destroy the catalyst. When the products of the reactions are aryl ketones, alkyl-aromatic compound, or sulfones, these are usually readily separated from the catalyst or ionic liquid/catalyst mixture by several different means as these are generally neutral covalent molecules. These are usually (but not necessarily) neutral covalent molecules, which are. The simplest and preferred means is vacuum distillation (typically at 1 mm Hg) of the product and by-product directly from the reaction vessel (Kugelrohr distillation is preferred but not essential). The catalyst and ionic liquid, having no measurable vapour pressure, remain in the reaction vessel. The catalyst and/or ionic liquid can be immediately reused upon cooling. A second valuable method for the separation of the ionic liquid/catalyst from the products is solvent extraction. The ionic liquid and catalyst are insoluble in low or non-polar organic solvents or supercritical fluids. The reaction vessel can be washed with a solvent or mixture of solvents such that the product and by-product dissolve in the solvent, whereas the ionic liquid and catalyst remain in a separate solution. The separation can be effected by decantation or other means. Suitable solvents for this separation are alkanes (cyclohexane, hexane, petroleum ether or other alkanes or alkane-like compounds), aromatics (toluene, benzene, xylene or other compounds containing an aromatic group), ethers (such as diethyl ether, dibutyl ether) or esters (such as ethyl acetate, amyl acetate), supercritical solvents, or any other material capable of allowing for the separation of the catalyst (and ionic liquid if present) from the products or reagents. Another method involved azeotropic separation with compounds such as steam (for example steam distillation). Some halogenated solvents such as dichloromethane or chloroform partially dissolve the ionic liquid and catalyst and are therefore of lesser use in this process. Thus the present invention provides a process where the product is easily separated from the catalyst or catalyst/ionic liquid combination or solvent containing combination by solvent extraction, distillation, vacuum distillation, steam distillation, pervaporation, azeotropic distillation, precipitation, crystallisation, phase separation, supercritical fluid extraction or any other non-destructive physical process. The present invention further provides a process where the product is easily separated from the catalyst or catalyst/ionic liquid combination or solvent containing combination by solvent extraction using one or more of the following methods: (a) with alkanes or boiling alkanes (eg. cyclohexane at 80° C.), (b) vacuum distillation at pressures preferably between 0.01 mmHg and 10 mmHg, (c) steam distillation or with the use of superheated steam at temperatures up to 500° C., (d) phase separation, (e) supercritical fluid extraction preferably with carbon dioxide.

The present invention relates to the use of metal bis-triflimides in solvent-free conditions or in ionic liquids. The reactions of aromatics both more and less reactive than anisole can be achieved in this invention, as well as the reaction of anisole itself. The present invention also provides a method of generating the catalyst in situ thus obviating the need to isolate the metal bis-triflimide catalyst and simplifying the experimental procedure. One of the principal benefits of this invention is that the product(s) of the reaction can be easily separated from the catalyst and/or ionic liquid-catalyst combination by a physical process such as distillation, steam stripping or by solvent extraction with an inert solvent (including supercritical fluids) or molecular solvents. The ionic liquid and/or the catalyst (which usually remains in the ionic liquid during the separation process) can be reused for further reactions. Further reactants can simply be added to the ionic liquid and/or the catalyst once the previous products/reactants have been removed.

The present invention is illustrated by the following figures and examples.

EXAMPLE 1

Figure 1:
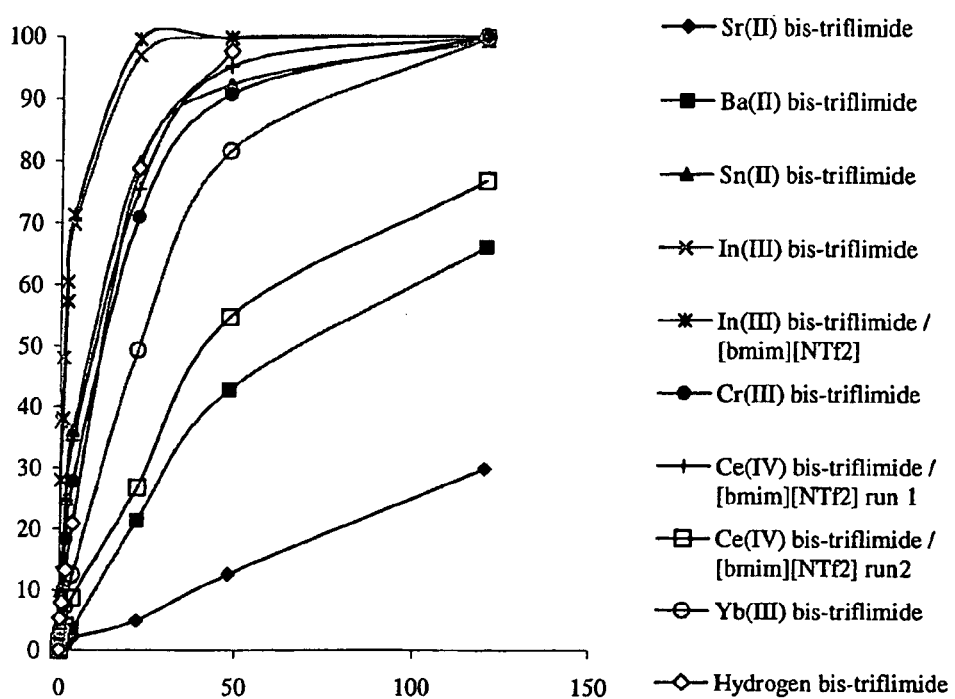
FIG. 1 shows the variation of yield with time in the metal bis-triflimide catalysed reaction of benzoyl chloride with toluene.

The Reaction of Toluene with Benzoyl Chloride with Cobalt(II) bis-triflimide Catalyst Cobalt(II) bis-triflimide (0.13 g, 0.21 mmol) was added to toluene (3.0 g, 32.5 mmol) and benzoyl chloride (3.0 g, 21.3 mmol) in a 25 cm$^3$ round bottomed flask equipped with a magnetic stirrer and reflux condenser. The mixture was heated under reflux for 3 hours (judged to be at least 99% complete by gas chromatographic analysis), and cooled to room temperature. Petroleum ether (15 cm$^3$, bp=40-60° C.) was added and the catalyst precipitated out of solution. The solution of the product was decanted and the flask washed with a further 15 cm$^3$ of petroleum ether. The solvent was evaporated from the combined petroleum ether extracts and the product purified by vacuum distillation (bp=160-170° C. @ 1 mmHg) in a Kugelrohr apparatus. This gave methylbenzophenone (4.05 g, 97% isolated yield). The catalyst can be reused immediately by adding toluene and benzoyl chloride to the flask (containing the precipitate) and repeating the reaction.

EXAMPLE 2

The reaction of Toluene with Benzoyl Chloride with Cobalt(II) bis-triflimide Catalyst in [emim] [$NTf_2$]

Cobalt(II) bis-triflimide (0.13 g, 0.21 mmol) was added to 1-ethyl-3-methylimidazolium bis-trifluoromethanesulfonimide ([emim][$NTf_2$]) (2.0 g) in a 25 cm$^3$ round-bottomed flask equipped with a magnetic stirrer and reflux condenser, and the mixture stirred until the catalyst dissolved. Toluene (3.0 g, 32.5 mmol) and benzoyl chloride (3.0 g, 21.3 mmol) were added. The mixture was heated under reflux for 0.5 hours (judged to be at least 99% complete by gas chromatographic analysis), and cooled to room temperature. Petroleum ether (15 cm$^3$, bp=40-60° C.) was added and the catalyst and ionic liquid formed a separate phase. The solution of the product was decanted and the flask (containing the ionic liquid and catalyst) washed three times with 15 cm$^3$ of petroleum ether. The solvent was evaporated from the combined petroleum ether extracts and the product purified by vacuum distillation (bp=160-170° C. @ 1 mmHg) in a Kugelrohr apparatus. This gave methylbenzophenone (4.02 g, 96%). The catalyst and ionic liquid combination can be reused immediately by adding toluene and benzoyl chloride to the flask and repeating the reaction, without loss of activity.

Examples 1 and 2 show that the acylation of toluene with benzoyl chloride can be carried out with a cobalt(II) bis-triflimide catalyst and that this can be performed with or without an ionic liquid present. However, with the ionic liquid, faster reaction rates are obtained and the catalyst can be recycled more easily. Without the ionic liquid, the products of this reaction are obtained in quantitative yield using 1 mol % catalyst after 3 hours heating under reflux (example 1). The reaction time is reduced to 30 minutes when the reaction is carried out in the ionic liquid [emim][NTf$_2$] ([emim]=1-ethyl-3-methylimidazolium) (example 2).

EXAMPLE 3

The Reaction of Toluene with Benzoyl Chloride with Nickel(II) bis-triflimide Catalyst in [emim] [NTf$_2$]

Nickel(II) bis-triflimide (0.13 g, 0.21 mmol) was added to 1-ethyl-3-methylimidazolium bis-trifluoromethanesulfonimide ([emim] [NTf$_2$]) (2.0 g) 25 cm$^3$ in a round-bottomed flask equipped with a magnetic stirrer and reflux condenser, and the mixture stirred until the catalyst dissolved. Toluene (3.0 g, 32.5 mmol) and benzoyl chloride (3.0 g, 21.3 mmol) were added. The mixture was heated under reflux for 1 hour (judged to be at least 99% complete by gas chromatographic analysis), and cooled to room temperature. Petroleum ether (15 cm$^3$, bp=40-60° C.) was added and the catalyst and ionic liquid formed a separate phase. The solution of the product was decanted and the flask (containing the ionic liquid and catalyst) washed three times with 15 cm$^3$ of petroleum ether. The solvent was evaporated from the combined petroleum ether extracts and the product purified by vacuum distillation (bp=160-170° C. @ 1 mmHg) in a Kugelrohr apparatus. This gave methylbenzophenone (4.04 g, 97% isolated yield). The catalyst and ionic liquid combination can be reused immediately by adding toluene and benzoyl chloride to the flask and repeating the reaction, without loss of activity.

The results from Examples 2 and 3 are shown in Table.

TABLE 1

The gas chromatographic (GC) yields of benzophenones derived from the reaction of benzoyl chloride with toluene with 1% metal bis-triflimide catalyst in [emim][NTf$_2$].

| Compound | Yield | Time/h |
|---|---|---|
| Co(NTf$_2$)$_2$ | 99 | 0.5 |
| Ni(NTf$_2$)$_2$ | 99 | 1 |

EXAMPLE 4

Anisole (0.30 cm$^3$, 2.8 mmol), acetic anhydride (0.50 cm$^3$, 5.0 mmol), M(NTf$_2$)$_n$ catalyst (0.1375 mmol (M=Al, n=3; M=Zn, n=2; M=Yb, n=3; M=Y, n=3)) were dissolved in the ionic liquid [bmim] [PF$_6$]. These four reactions were heated at 30° C. for 24 hours. The course of the reaction was determined by HPLC analysis of the reaction mixture and the yields are shown in Table 2.

TABLE 2

The variation of GC yield with time for the acetylation of anisole with acetic anhydride with metal bis-triflimide catalysts in [bmim][PF$_6$].

| Catalyst | % Yield (35 min) | % Yield (115 min) | % Yield (245 min) | % Yield (1375 min) |
|---|---|---|---|---|
| Al(NTf$_2$)$_3$ | 45 | 55 | 61 | 63 |
| Zn(NTf$_2$)$_3$ | 23 | 36 | 44 | 61 |
| Yb(NTf$_2$)$_3$ | 49 | 61 | 64 | 69 |
| Y(NTf$_2$)$_3$ | 55 | 62 | | 71 |

EXAMPLE 5

Anisole (0.50 cm$^3$, 4.6 mmol), benzoic anhydride (1.15 g, 5.06 mmol), M(NTf$_2$)$_n$ catalyst (0.23 mmol (M=Al, n=3, 0.20 g; M=Ce, n=4, 0.29 g)) were dissolved in the ionic liquid [bmim] [NTf$_2$] (2.0 g). These two reactions were heated at 60° C. for 24 hours. The course of the reaction was determined by gas chromatographic analysis of the reaction mixture and the yields are shown in Table 3.

TABLE 3

The variation of GC yield with time for the benzoylation of anisole with benzoic anhydride with metal bis-triflimide catalysts in [bmim][PF$_6$].

| Catalyst | % Yield (60 min) | % Yield (120 min) | % Yield (180 min) | % Yield (1350 min) |
|---|---|---|---|---|
| Al(NTf$_2$)$_3$ | 44 | 62 | 67 | 68 |
| Ce(NTf$_2$)$_4$ | 32 | 49 | 56 | 84 |

EXAMPLE 6

Fluorobenzene (5.77 g, 60 mmol), 4-fluorobenzoyl chloride (4.75 g, 30 mmol), ZnCl$_2$ (1.36 g, 10 mmol) and [emim] [NTf$_2$] were placed in an autoclave and heated with stirring for 48 hours at 160° C. The reactor was cooled and the pressure (HCl gas) released. Gas chromatographic analysis showed that a 99% conversion to a mixture of 2,4'-difluorobenzophenone, 3,4'-difluorobenzophenone, 4,4'-difluorobenzophenone in 17:8:75 ratio respectively. The difluorobenzophenones were isolated by solvent extraction with petroleum ether (bp=40-60° C.), followed by evaporation of the solvent. The ionic liquid/zinc chloride catalyst system could be used in further reactions, with similar activity. This result shows that the classically unreactive aromatic compound fluorobenzene can be acylated with 4-fluorobenzoyl chloride to give isomers of 2-, 3-, or 4-4'-difluorobenzophenone in [emim] [NTf$_2$] using an in situ zinc catalyst. This catalyst was generated by dissolving zinc(II) chloride in the [emim] [NTf$_2$] ionic liquid. The reaction gave a 95% yield (17:8:75 o-, m-, p-isomer ratio).

EXAMPLE 7

Benzoic acid (0.31 g, 2.5 mmol), m-xylene (0.53 g, 5.0 mmol), [bmim] [NTf$_2$] (0.50 g) and M(NTf$_2$)$_2$ (M=Co (0.14 g, 0.25 mmol), or Zn (0.15 g, 0.25 mmol) were placed in flasks equipped with stirrers and condensers. The contents of the flask were heated under reflux (ca 140-150° C.) for 2 days, then cooled to room temperature. The products were analysed by gas chromatographic analysis and found to give 93 and 87% conversions (for Co and Zn bis-triflimide reactions respectively) to 2,4-dimethylbenzophenone and, it is believed to be, 2,6-dimethylbenzophenone (11:1 isomer ratio in both cases). The results show that Zinc and cobalt bis-triflimide have been found to catalyse the benzoylation of m-xylene with benzoic acid. The reaction is slower that the corresponding reaction with benzoyl chloride. The catalyst was recycled and the reaction was repeated. The results of the repeat experiment are shown in Table 4.

TABLE 4

The yields of benzophenones derived from the reaction of benzoic acid with m-xylene with 10% recycled metal bis-triflimide catalyst in [bmim][NTf$_2$] at 140° C. for 48 hours.

| Compound | % Yield | 2,4- to 2,6- ratio |
|---|---|---|
| Zn(NTf$_2$)$_2$ | 40 | 11:1 |
| Co(NTf$_2$)$_2$ | 82 | 11:1 |

These are remarkable results given the low reactivity of benzoic acid. It is to be noted that this reaction produces water as a byproduct and as such it is a very environmentally friendly reaction. Furthermore, it utilises a non corrosive starting material (benzoic acid) and therefore is an safer reaction to perform than the corresponding reaction with benzoyl chloride. It can be concluded that this is a superior way to produce dimethylbenzophenone.

EXAMPLE 8

The Reaction of Toluene with Benzoyl Chloride with Zinc(II) or Copper(II) bis-triflimide Catalyst in [emim][NTf$_2$]

Copper or zinc (II) bis-triflimide (0.13 g, 0.21 mmol) was added to a mixture of toluene (3.0 g, 32.5 mmol) and benzoyl chloride (3.0 g, 21.3 mmol). The mixture was heated under reflux for 72 hours (the reaction was monitored by gas chromatographic analysis, by taking a drop of the reaction mixture and suspending it in petroleum ether (b.p.=40-60° C.) and filtering off the catalyst. The starting materials and products, which are soluble in the petroleum ether extract, were cooled to room temperature. Petroleum ether (15 cm$^3$, bp=40-60° C.) was added and the catalyst and formed a separate phase. The solution of the product was decanted and the flask (containing the catalyst) washed three times with 15 cm$^3$ of petroleum ether. The solvent was evaporated from the combined petroleum ether extracts and the product purified by vacuum distillation (bp=160-170° C. @ 1 mmHg) in a Kugelrohr apparatus. This gave methylbenzophenone (4.0 g, 95%). The catalyst can be reused immediately by adding toluene and benzoyl chloride to the flask and repeating the reaction, without loss of activity. The yields as determined by gas chromatographic analysis are shown in Table 5.

TABLE 5 the yields of benzophenones derived from the reaction of benzoyl chloride with toluene with 1% copper(II) or 1% zinc(II) bis-triflimide catalysts. The figure in brackets refers to the o-, m- and p- isomer ratios.

| Time/h | Yield with Zn(NTf$_2$)$_2$ | Yield with Cu(NTf$_2$)$_2$ |
|---|---|---|
| 24 | 83 | 52 |
| 48 | 99 (22:1:77) | |
| 72 | | 99 (20:2:78) |

Zinc(II) and copper(II) bis-triflimide compounds were found to be effective acylation catalysts for the benzoylation of toluene.

EXAMPLE 9

The Reaction of o-xylene with Benzoyl Chloride with an Aluminium(III) bis-triflimide Catalyst Aluminium (III) bis-triflimide (0.10 g) was added to a mixture of o-xylene (3.0 g, 28.2 mmol) and benzoyl chloride (3.0 g, 21.3 mmol). The mixture was heated at 120° C. for 18 hours (the reaction was monitored by gas chromatographic analysis, by taking a drop of the reaction mixture and suspending it in petroleum ether (b.p.=40-60° C.) and filtering off the catalyst. The starting materials and product are soluble in the petroleum ether extract), and cooled to room temperature. Petroleum ether (15 cm$^3$) was added and the catalyst and formed a separate phase.

The yields as determined by gas chromatographic analysis was 99% with a 6.0:1 3,4- to 2,3-dimethylbenzophenone isomer ratio. Aluminium(III) bis-triflimide was found to be an effective catalyst for the benzoylation of o-xylene. The reaction gave a quantitative yield of two isomers of the corresponding benzophenone (6:1 3,4- to 2,3-isomer ratio) after 18 h at 120° C., using 1 mol % of catalyst.

EXAMPLE 10

The Reaction of Toluene with Benzoyl Chloride with Metal bis-triflimide Catalyst Various metal (1-ethyl-3-methylimidazolium, Li, Mg, Ca, Mn, Co, Ni, Cu, Zn, Sn, Pb, Al) bis-triflimide salts (1 mol %) was added to a mixture of toluene (3.0 g, 32.6 mmol) and benzoyl chloride (3.0 g, 21.3 mmol). The mixture was heated at 110° C. for up to 120 hours. The reaction was monitored at regular intervals by gas chromatographic analysis and the reaction stopped when the reaction was judged to be 99% complete by cooling to room temperature. Petroleum ether (15 cm$^3$) was added and the catalyst and formed a separate phase. The product was isolated be decanting the petroleum ether extract, followed by Kugenrohr distillation at 1 mm Hg. The yields after various time intervals are given in Table 6. The product formed is methylbenzophenone. In all these reactions, the isomer ratio was found to be approximately 76% para and 24% ortho. This results are shown in Table 6. Table 1 lists the times required for Co and Ni bis-triflimide in [emim] [NTf$_2$].

TABLE 6

The yields of benzophenones derived from the reaction of benzoyl chloride with toluene with 1% metal bis-triflimide catalyst.

| Compound | Yield/% | Time/h |
| --- | --- | --- |
| [emim][NTf$_2$] | <1 | 48 |
| Li NTf$_2$ | <5 | 120 |
| Mg(NTf$_2$)$_2$ | 99 | 48 |
| Ca(NTf$_2$)$_2$ | <5 | 120 |
| Mn(NTf$_2$)$_2$ | 99 | 5 |
| Co(NTf$_2$)$_2$ | 99 | 3 |
| Ni(NTf$_2$)$_2$ | 99 | 4 |
| Cu(NTf$_2$)$_2$ | 99 | 72 |
| Zn(NTf$_2$)$_2$ | 99 | 48 |
| Sn(NTf$_2$)$_2$ | 55 | 48 |
| Pb(NTf$_2$)$_2$ | 95 | 6 |
| Al(NTf$_2$)$_3$ | 99 | 24 |

From Table 6, a remarkable difference in reactivity between the compounds chosen is observed. Of these, four compounds appear to have unexpectedly high reactivity, namely those of manganese, cobalt, nickel and lead, whereas compounds such as zinc bis-triflimide and aluminium bis-triflimide have relatively modest activity. This is completely different to "conventional Friedel-Crafts chemistry" which would suggest that the Al bistriflimide should be the best catalyst. Of particular remark is the catalytic reactivity of Co and Pb. Lithium and calcium bis-triflimide in contrast show very poor activity and with [emim] [bis-triflimide], little or no reaction was observed.

EXAMPLE 11

The Reaction of Chlorobenzene with Benzoyl Chloride with Nickel(II) bis-triflimide Catalyst in [bmim] [NTf$_2$]

Nickel(II) bis-triflimide (0.062 g, 0.1 mmol) was added to 1-butyl-3-methylimidazolium bis-trifluoromethanesulfonimide ([bmim] [NTf$_2$]) (1.0 g) in a 25 cm$^3$ round-bottomed flask equipped with a magnetic stirrer and reflux condenser, and the mixture stirred until the catalyst dissolved. Chlorobenzene (1.68 g, 15 mmol) and benzoyl chloride (1.41 g, 10 mmol) were added. The mixture was heated under reflux for 72 hours and was analysed by gas chromatographic analysis as in previous examples. The reaction was cooled to room temperature. Petroleum ether (15 cm$^3$, bp=40-60° C.) was added and the catalyst and ionic liquid formed a separate phase from the petroleum ether layer. The solution of the product (in petroleum ether) was decanted and the flask (containing the ionic liquid and catalyst) washed three times with 15 cm$^3$ of petroleum ether. Concentration of the organic extract, followed by Kugenrohr distillation at 1 mm Hg (bp=170-190° C.), gave chlorobenzophenone (1.65 g, 74%) GC analysis showed 78% yield after 72 hours, with a 70:8 4- to 2-isomer ratio. This is a remarkable result, as chlorobenzene is known to be classically unreactive in acylation reactions. It has not previously been possible to isolate significant quantities of the products of the acylation of chlorobenzene.

EXAMPLE 12

The Reaction of Chlorobenzene with Benzoyl Chloride with Cobalt(II) bis-triflimide or Zinc(II) bis-triflimide Catalyst in [bmim] [NTf$_2$]

In two separate reactions, either zinc(II) bis-triflimide (0.16 g, 5 mol %) or cobalt(II) bis-triflimide (0.15 g, 5 mol %) was added to 1-butyl-3-methylimidazolium bis-trifluoromethanesulfonimide ([bmim] [NTf$_2$]) (1.0 g) 25 cm$^3$ in a round-bottomed flask equipped with a magnetic stirrer and reflux condenser, and the mixture was heated gently and stirred until the catalyst dissolved. Chlorobenzene (0.68 g, 6 mmol) and benzoyl chloride (0.72 g, 5 mmol) were added. The mixture was heated under reflux for 18 hours and was analysed by gas chromatographic analysis as in previous examples. The reaction was cooled to room temperature. Cyclohexane (15 cm$^3$) was added and the catalyst and ionic liquid formed a separate phase. The solution of the product was decanted and the flask (containing the ionic liquid and catalyst) washed three times with 15 cm$^3$ cyclohexane followed by Kugelrohr distillation at 1 mm Hg (bp=180-200° C.) This gave a mixture of 2- and 4-chlorobenzophenone. GC yield=97% (6.8:1 p- to o-isomer ratio) for cobalt catalyst and 55% GC yield (6.5:1 p- to o-isomer ratio) for the zinc catalyst.

The reaction of chlorobenzene with benzoyl chloride was investigated, as chlorobenzene is much more difficult to acylate. Although reasonable yields could be obtained with 1 mol % catalyst, it was found that 5-mol % catalyst gave more acceptable reaction rates. The reaction was found to be 95% complete with cobalt bis-triflimide after 18 hours and 55% complete with zinc bis-triflimide (Table 7). The catalyst was found to be less active after extracting the product with boiling cyclohexane and recycling the ionic liquid/catalyst. The activity of the catalyst was restored by adding a trace of hydrogen bis-triflimide (0.1 mol %).

TABLE 7

The yields of benzophenones derived from the reaction of benzoyl chloride with chlorobenzene with 5% metal bis-triflimide catalyst in [bmim][NTf$_2$].

| Compound | Yield | Time/h |
| --- | --- | --- |
| Co(NTf$_2$)$_2$ | 95 | 18 |
| Zn(NTf$_2$)$_2$ | 55 | 18 |

EXAMPLE 13

The Reaction of Toluene with Benzoyl Chloride with Hydrogen and Metal bis-triflimide Catalyst Various metal bis-triflimide compounds: Sr(II), Ba(II), In(III), In(III) in [bmim] [NTf$_2$], Cr(III), Ce(IV), Yb(III), and hydrogen bis-triflimide {HN(SO$_2$CF$_3$)$_2$} (1 mol %) were added to a mixture of toluene (1.38 g, 15.0 mmol) and benzoyl chloride (1.41 g, 10.0 mmol). The mixture was heated at 110° C. for up to 120 hours. The reaction was monitored at various intervals by gas chromatographic analysis and the reaction stopped after 5 days. The yields of methylbenzophenone with respect to time are shown in FIG. 1. The reaction of benzoyl chloride and toluene gave 2- and 4-methylbenzophenone. All these compounds were found to be active Friedel-Crafts catalysts, but with considerably different activities. Of these, the activities of indium(III) and iron(III) (Example 14) are the most notable, as they are exceptionally good catalysts. The p- to o-selectivities were in the range 3.9 to 4.4 to 1, with the indium and iron catalysts giving 4.4:1 selectivity.

EXAMPLE 14

The Reaction of Toluene with Benzoyl Chloride with Iron(III) bis-triflimide or Iron(III) Chloride Dissolved in [bmim] [NTf$_2$]

Figure 2:
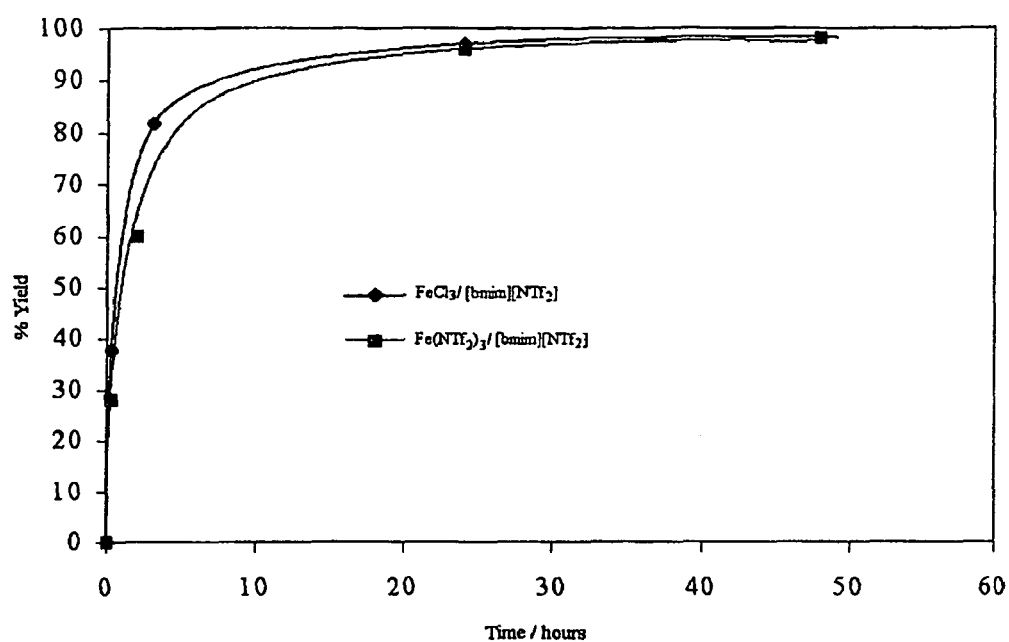
FIG. 2 shows the variation of yield with time in the 1% $FeCl_3$ and 1% Fe bis-triflimide catalysed reaction of benzoyl chloride with toluene in [bmim] [$NTf_2$].

In two separate reactions, either iron(III) bis-triflimide (1 mol %) or iron(III) chloride (1 mol %) was added to 1-butyl-3-methylimidazolium bis-trifluoromethanesulfonimide ([bmim] [NTf$_2$]) (1.0 g) 25 cm$^3$ in a round-bottomed flask equipped with a magnetic stirrer and reflux condenser, and the mixture was heated gently and stirred until the catalyst dissolved. Toluene (1.38 g, 15 mmol) and benzoyl chloride (1.41 g, 10 mmol) were added. The mixture was heated under reflux for 48 hours and was analysed by gas chromatographic analysis as in previous examples. The yield of methylbenzophenone with respect to time is shown in FIG. 2. Here, the activity of the iron catalyst was tested in two separate ways: (a) with 1% FeO(NTf$_2$) in [bmim] [NTf$_2$] and (b) 1% FeCl$_3$ in [bmim] [NTf$_2$]. In both cases, the activity and selectivity were similar, indicating that FeCl$_3$ and FeO(NTf$_2$) are possibly precursors to catalyst, when dissolved in excess [bmim] [NTf$_2$].

EXAMPLE 15

The Reaction of Toluene with Methane Sulfonyl Chloride with Zinc(II) bis-triflimide Zinc(II) bis-triflimide (0.13 g, 2.5 mol %) was added to a round-bottomed flask equipped with a magnetic stirrer and reflux condenser. Toluene (1.38 g, 15 mmol) and methane sulfonyl chloride (1.14 g, 10 mmol) were added. The mixture was heated under reflux for 24 hours and was analysed by gas chromatographic analysis as in previous examples. All the methane sulfonyl chloride had reacted and three isomers of (2-, 3- and 4-methylphenyl)methylsulfone had formed (yield=99%), isomer ratio=35:18:47 for the o-, m- and p-isomers. The product was extracted from the catalyst by dissolving it in cyclohexane (20 cm$^3$) followed by decantation of the cyclohexane extract. The catalyst was washed with cyclohexane (2×20 cm$^3$) and the combined cyclohexane extracts were concentrated on a rotary evaporator. The product was Kugelrohr distilled at 100-110° C. to give 1.62 g of a colourless oil (96% isolated yield).

EXAMPLE 16

The Reaction of Benzene with Benzene Sulfonyl Chloride with Zinc(II) bis-triflimide Zinc(II) bis-triflimide (0.062 g, 1 mol %) was dissolved in [bmim] [NTf$_2$] (1.0 g) in a round-bottomed flask equipped with a magnetic stirrer and reflux condenser. Benzene (1.56 g, 20 mmol) and benzene sulfonyl chloride (1.76 g, 10 mmol) were added. The mixture was heated under reflux for 18 hours and was analysed by gas chromatographic analysis as in previous examples. All the benzene sulfonyl chloride had reacted and diphenyl sulfone had formed (yield=99%). The product was extracted from the catalyst and ionic liquid by dissolving it in boiling cyclohexane (5×30 cm$^3$) followed by decantation of the cyclohexane extract. The diphenylsulfone crystalised on cooling and was collected by filtration (2.03 g, 93% isolated yield). The reaction of benzene with benzene sulfonyl chloride gave the expected diphenyl sulfone in 99% yield with a Zn(NTf$_2$)$_2$ catalyst (18 h at reflux) The diphenyl sulfone was extracted with boiling cyclohexane and the ionic liquid and catalyst could be reused.

EXAMPLE 17

The Reaction of m-xylene with Benzene Sulfonyl Chloride with Zinc(II) bis-triflimide Zinc(II) bis-triflimide (0.062 g, 1 mol %) was dissolved in [bmim] [NTf$_2$] (1.0 g) in a round-bottomed flask equipped with a magnetic stirrer and reflux condenser and m-xylene (2.12 g, 20 mmol) and benzene sulfonyl chloride (1.76 g, 10 mmol) were added. The mixture was heated under reflux for 18 hours and was analysed by gas chromatographic analysis as in previous examples. All the benzene sulfonyl chloride had reacted and mostly 2,4-dimethyldiphenylsulfone had formed (yield=99%, 20:1 isomer ratio {by NMR}). The major product is shown below, the structure of the minor isomer is not known but is believed to be the 2,6-dimethyl isomer.

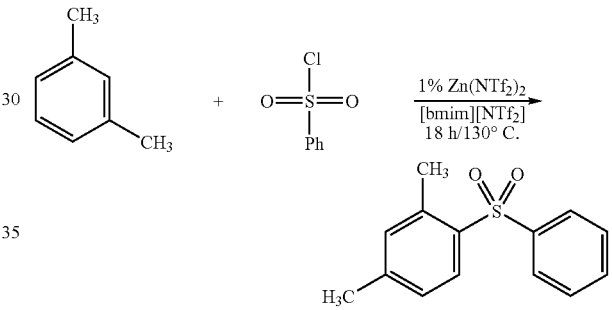

The product was extracted from the catalyst and ionic liquid by dissolving it in boiling cyclohexane (5×30 cm$^3$) followed by decantation of the cyclohexane extract. The 2,4-dimethyldiphenylsulfone crystalised on cooling and was collected by filtration.

EXAMPLE 18

Figure 3:
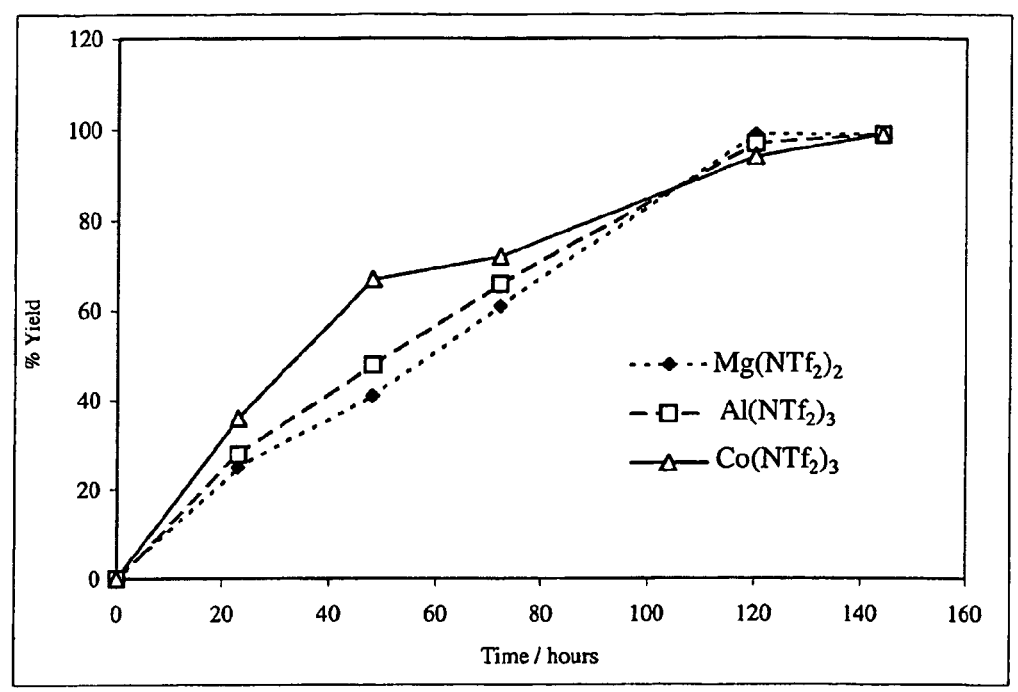
FIG. 3 shows the variation of yield with time in the synthesis of phenyl-4-chlorophenyl sulfone.

The Reaction of Chlorobenzene with Benzene Sulfonyl Chloride with Metal bis-triflimide Catalysts In three separate reactions, either magnesium(II) bis-triflimide (0.058 g, 0.1 mol), aluminium(III) bis-triflimide (0.87 g, 0.1 mmol) or cobalt(II) bis-triflimide (0.062 g, 0.1 mmol) was dissolved in [bmim] [NTf$_2$] (0.5 g) in a round-bottomed flask equipped with a magnetic stirrer and reflux condenser. Chlorobenzene (1.68 g, 15 mmol) and benzene sulfonyl chloride (1.76 g, 10 mmol) were added. The mixture was heated under reflux for 144 hours and monitored by gas chromatographic analysis as in previous examples. The yields with respect to time are given in FIG. 3. The product was extracted from the catalyst and ionic liquid by dissolving it in boiling cyclohexane (4×10 cm$^3$) followed by decantation of the cyclohexane extract. The 2- and 4-chlorodiphenylsulfone (9:1 p- to o-isomer ratio) crystalised on cooling and was collected by filtration. The selectivity was 9:1 for the p-isomer and the o-isomer was the minor isomer in all cases. Coincidently, the reaction of benzoyl chloride with chlorobenzene also gave the same selectivity and similar reaction rates. Phenyl-4-chlorophenylsulfone is an insecticide. The reaction was found to be slow using 1 mol % catalyst, but 5 mol % catalyst gave acceptable reaction rates. The metal salts chosen were aluminium(III), cobalt(II) and magnesium(II) bis-triflimide, in the ionic liquid [bmim] [NTf$_2$]. All three catalysts were found to be effective for this reaction. The reaction is shown below.

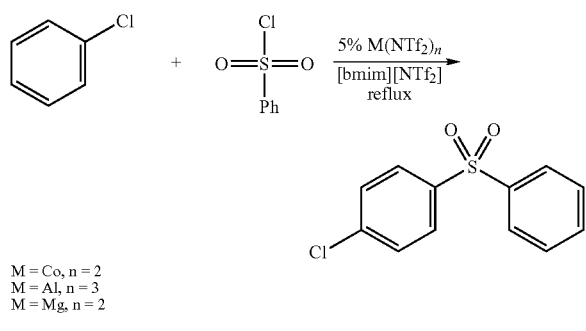

M = Co, n = 2
M = Al, n = 3
M = Mg, n = 2

EXAMPLE 19

The Reaction of Benzene with oct-1-ene with Nickel(II) bis-triflimide

Nickel(II) bis-triflimide (0.06 g, 0.1 mmol) was dissolved in [bmim] [NTf$_2$] (1.0 g) in a round-bottomed flask equipped with a magnetic stirrer and reflux condenser. Benzene (3.90 g, 50 mmol) and oct-1-ene (1.12 g, 10 mmol) were added. The mixture was heated under reflux for 18 hours and was analysed by gas chromatographic analysis as in previous examples. The oct-1-ene peak disappeared and three isomers of octyl-benzene were formed (70%, 20:26:54 2- to 3- to 4-isomer ratio) as well as octene dimer (30%). The less dense product phase was decanted from the ionic/catalyst phase and purified by Kugelrohr distillation. The ionic liquid and catalyst were prepared for reuse by heating at 60° C. under vacuum for 1 hour. The ionic liquid and catalyst were used for further reactions of benzene with oct-1-ene without loss of activity. This is an alkylation of benzene with an alkene using a metal bis-triflimide catalyst. Benzene and oct-1-ene react in the presence of 1% nickel(II) bis-triflimide in [bmim] [NTf$_2$] to form three isomers of octyl benzene and a small amount of hexadecene (unknown isomeric distribution). This reaction shown below:

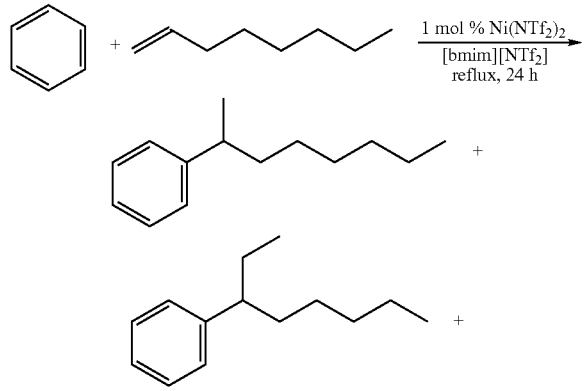

The alkylation of benzene with oct-1-ene. The reaction gave a 70% yield (by GC) of three isomers of octylbenzene. The isomer ratio was determined to be 0.75:1.00:2.03, with the 4-phenyloctene as the major product and 2-phenyloctene as the minor product. During the course of the reaction, isomeration of oct-1-ene to a number of isomers of octene was observed, and the rate of this isomerisation process was considerably faster that the alkylation reaction. It was found that the ionic liquid/catalyst combination remained active on a second run. To confirm that the minor product of the reaction was an octene dimer, the same reaction was performed, but without any benzene present (shown below).

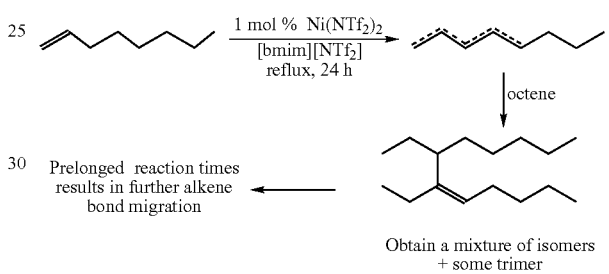

The dimerisation of oct-1-ene.

The reaction proceeded initially with isomerisation of octene to a mixture of 4 isomers of octene. After 18 hours, the reaction was almost complete (>95% conversion). The products were a large number of isomers of dimerised and trimerised octene. As the reaction was left to run for 6 days, a broadening of the cluster of GC peaked for the dimer and trimer was observed, indicating that further isomerisation was occurring.

EXAMPLE 20

The Dimerisation of oct-1-ene with Nickel(II) bis-triflimide

Nickel(II) bis-triflimide (0.062 g, 0.1 mmol) was dissolved in [bmim] [NTf$_2$] (0.5 g) in a round-bottomed flask equipped with a magnetic stirrer and reflux condenser. Oct-1-ene (1.12 g, 10 mmol) was added. The mixture was heated under reflux for 18 hours and was analysed by gas chromatographic analysis as in previous examples. The oct-1-ene peak disappeared and three isomers of octene (oct-2-ene, oct-3-ene and oct-4-ene) were formed. Hydrogen bis-triflimide was added (0.0028 g, 0.1 mmol) and the mixture was heated for a further 18 hours. Gas chromatographic analysis showed that the reaction was almost complete (>99%), and gave a mixture of isomers of hexadecene and tetracosene (trimer of octene). The less dense product phase was decanted from the ionic/catalyst phase and purified by Kugelrohr distillation at 1 mm Hg. The ionic liquid and catalyst were prepared for reuse by heating at 60° C. under vacuum for 1 hour. The ionic liquid and catalyst were used for further dimerisation reactions of oct-1-ene without loss of activity.

EXAMPLE 21

The Fries Rearrangement of 4-methylphenoxybenzoate with Hydrogen and Metal bis-triflimide Compounds Ytterbium(III) bis-triflimide (0.1 g) and hydrogen bis-triflimide (0.01 g) was dissolved in [n-$H_{29}C_{14}$(n-$H_{13}C_6$)$_3$ P] [$NTf_2$] (1.0 g) in a round-bottomed flask equipped with a magnetic stirrer and reflux condenser. 4-methylphenoxybenzoate (1.0 g) was added. The mixture was heated under reflux for 24 hours at 60° C. and was analysed by gas chromatographic analysis as in previous examples. The product of the reaction was 2-hydroxy-5-methylbenzophenone (90% yield). The isomerisation of 4-methylphenoxybenzoate to 2-hydroxy-5-methylbenzophenone is shown below.

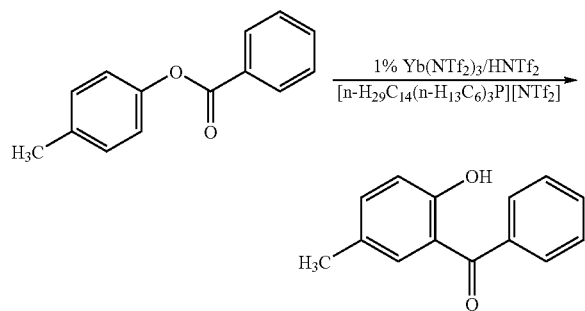

EXAMPLE 22

The Reaction of o-xylene, m-xylene, Mesitylene, and Toluene with Cyclohexene with Metal bis-triflimide Compounds In four separate reaction vessels, ytterbium(III) bis-triflimide (0.1 g) was dissolved in [n-$H_{29}C_{14}$(n-$H_{13}C_6$)$_3$P] [$NTf_2$] (2.0 g) in a round-bottomed flask equipped with a magnetic stirrer and reflux condenser. Either o-xylene (1.06 g, 10 mmol), m-xylene (1.06 g, 10 mmol), mesitylene (1.20 g, 10 mmol), or toluene (0.92 g, 10 mmol) were added to the separate flasks followed by addition of cyclohexene (0.82 g, 10 mmol). The mixtures were heated at 80° C. for 12 hours and were analysed by gas chromatographic analysis as in previous examples. The cyclohexene peak disappeared and peak(s) due to alkylation of the aromatic compound and peaks due to dimerisation reactions of cyclohexene were formed (see Example 26 for details). The ionic liquid and catalyst were prepared for reuse by heating at 60° C. under vacuum for 1 hour. The ionic liquid and catalyst were used for further reactions of benzene with cyclohexene without loss of activity.

EXAMPLE 23

The Reaction of Benzene with dodec-1-ene with Metal bis-triflimides, Triflates and Hydrogen bis-triflimide In ten separate reaction vessels (a multi-cell glass reactor with stirrers and condensers) metal triflimide or metal triflate compounds (see Table below) were added together with hydrogen bis-triflimide (0.01 g) to [n-$H_{29}C_{14}$(n-$H_{13}C_6$)$_3$P] [$NTf_2$] (2.0 g) and stirred until the metal compound had dissolved. Benzene (3.8 g, 50 mmol) and dodec-1-ene (0.84 g, 5.0 mmol) were added. The mixtures were heated at 80° C. for 24 hours. The excess benzene was distilled off. The mixture was analysed by NMR upon cooling to room temperature. The ionic liquid and catalyst were prepared for reuse by heating at 60° C. under vacuum for 1 hour. The ionic liquid and catalyst were used for further reactions of benzene with dodec-1-ene without loss of activity. The results are shown in Table 8 below.

TABLE 8

| Compound | Mass/g | Unreacted dodecene | Isomerised dodecene | Dodecyl benzene |
| --- | --- | --- | --- | --- |
| Yb(NTf$_2$)$_3$ | 1.02 | 0 | 0 | 100 |
| Co(NTf$_2$)$_2$ | 0.62 | 0 | 99 | 1 |
| Cu(NTf$_2$)$_2$ | 0.62 | 0 | 1 | 99 |
| Pb(NTf$_2$)$_2$ | 0.76 | 0 | 100 | 0 |
| In(NTf$_2$)$_3$ | 0.95 | 0 | 0 | 100 |
| Ga(NTf$_2$)$_3$ | 0.63 | 0 | 61 | 39 |
| Zn(OTf$_2$)$_2$ | 0.36 | 67 | 33 | 0 |
| Cu(OTf$_2$)$_2$ | 0.36 | 1 | 96 | 3 |
| Yb(OTf$_2$)$_3$ | 0.53 | 0 | 91 | 9 |
| La(OTf$_2$)$_3$ | 0.59 | 0 | 60 | 40 |

EXAMPLE 24

The Reaction of Toluene with Benzoyl Chloride with Metal Compounds Dissolved in [bmim] [$NTf_2$]

Figure 4:
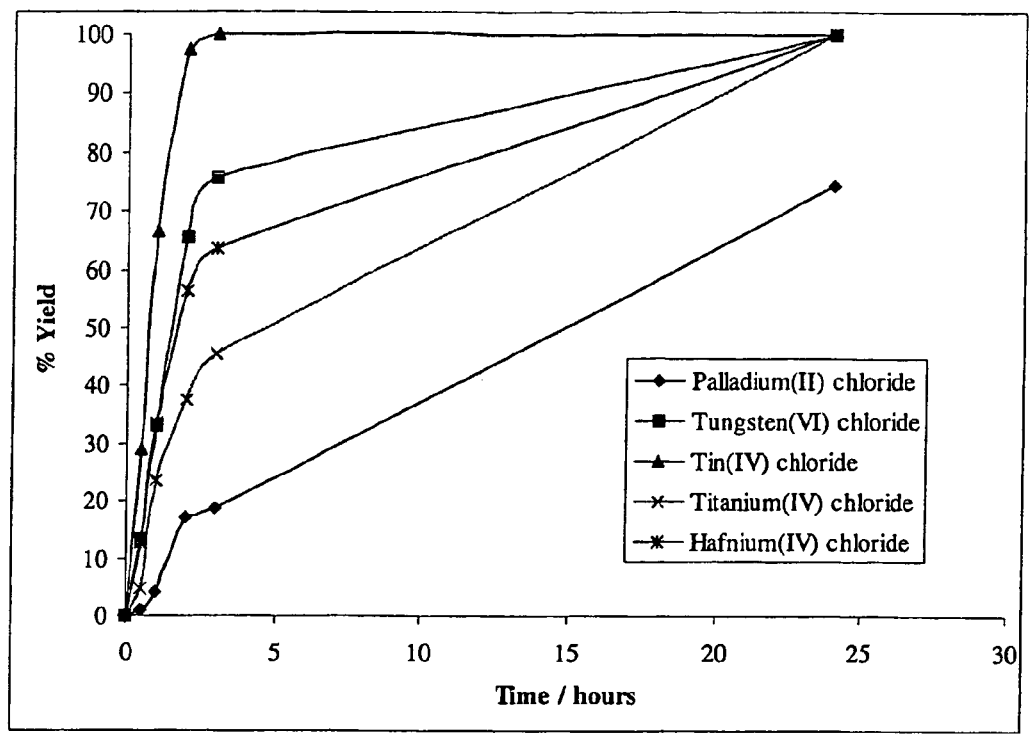
FIG. 4 shows the variation of yield with time for five reaction catalysed by 1 mol % metal chlorides dissolved in [bmim] [$NTf_2$] for the reaction of toluene with benzoyl chloride to give methyl benzophenone at 110° C.

In five separate reactions, either titanium(IV) chloride (1 mol %) or tin(IV) chloride (1 mol %), or tungsten(VI) chloride, or hafnium(IV) chloride or palladium(II) chloride was added to 1-butyl-3-methylimidazolium bis-trifluoromethanesulfonimide ([bmim] [$NTf_2$]) (2.0 g) 25 cm$^3$ in a round-bottomed flask equipped with a magnetic stirrer and reflux condenser, and the toluene (2.81 g, 30 mmol) and benzoyl chloride (2.84 g, 20 mmol) were added. The mixtures was heated under reflux for 24 hours and was analysed by gas chromatographic analysis as in previous examples. The conversion of starting materials to methylbenzophenone was quantitative except for the palladium(II) catalysed reaction (75% yield). The variation of yield with time in the reaction of several new metal bis-triflimide salts in the reaction of benzoyl chloride with toluene in given in FIG. 4. These reactions were performed in parallel, and the yields were determined by GC analysis.

In this invention, the use of a metal halide dissolved in a bis-triflimide ionic liquid can be used for reactions such as the Friedel-Crafts reactions. This is useful where a particular metal bis-triflimide salt is difficult to prepare or isolate. In this invention, five metal halides (chlorides) (1 mol % with respect to the reactants) were dissolved in [bmim] [$NTf_2$]. This combination was used to catalyse the reaction of toluene with benzoyl chloride to give methylbenzophenone. The yield with respect to time is given in FIG. 4. All of the metals chosen gave the expected products in good yield, but the combination of 1% mol tin(IV) chloride in [bmim] [$NTf_2$] was a particularly effective catalyst. This process of using metal compounds dissolved in an ionic liquid (usually bis-triflimide) can also be used with compounds of other metals (particularly transition metals (d-block) or f-block metals)) not listed in FIG. 3 or 4.

EXAMPLE 25

A number of aromatic sulfonylation reactions were performed. These reactions are very similar to Friedel-Crafts acylation reactions and are performed under similar conditions. The key difference is that a —SO$_2$—X group replaces a —CO—X (X=leaving group). In most cases, the selectivities, reactivities and yields were found similar to the corresponding acylation reaction. The reaction of sulfuryl chloride with benzene resulted in the formation of chlorobenzene (quantitatively) and SO$_2$. This is as is found in many other reactions of SO$_2$Cl$_2$ with aromatic compounds performed in molecular solvents.

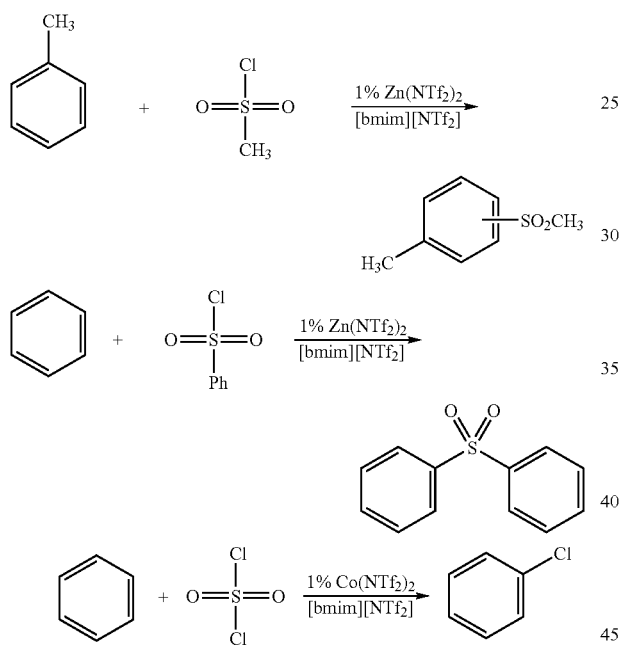

EXAMPLE 26

The alkylation of various aromatic compounds with cyclohexene in a phosphonium ionic liquid with 10% ytterbium (III) bis-triflimide with a trace of hydrogen bis-triflimide were carried out. A side reaction also takes place that results in the formation of a dimer of cyclohexene (see below) and this results in a slight reduction in the yield of the Friedel-Crafts reaction. However, is should be noted that this demonstrates that metal triflimide compounds can be used for dimerisation and oligomerisation reactions.

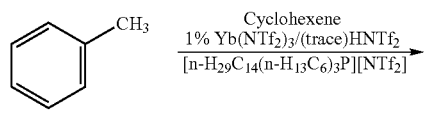

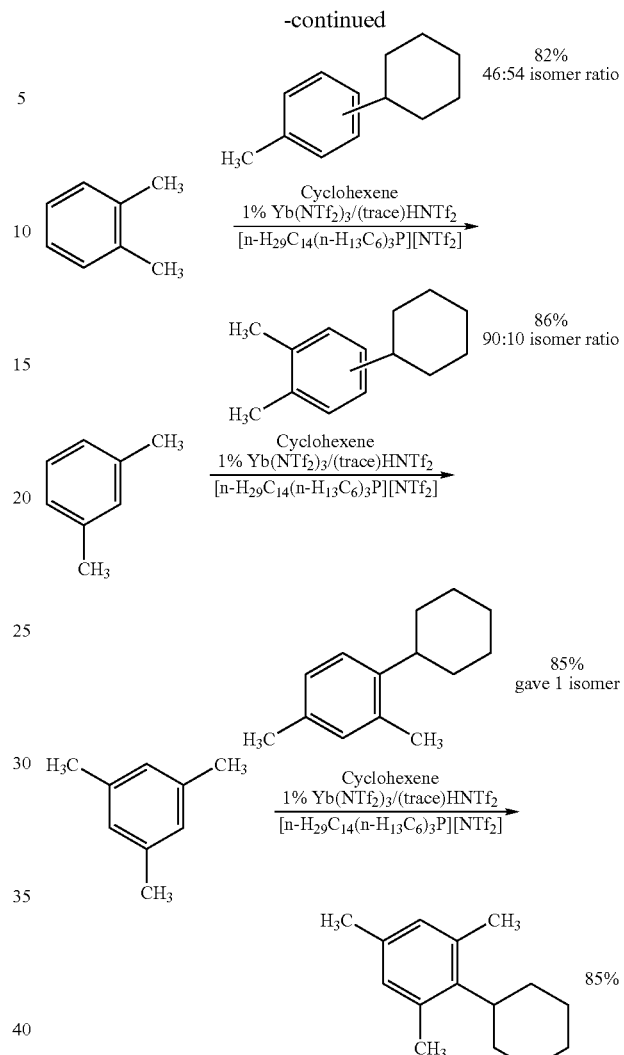

The reaction of aromatics with cyclohexene in a phosphonium ionic liquid for 12 hours at 80° C. is shown above. Below is shown the dimerisation of cyclohexene.

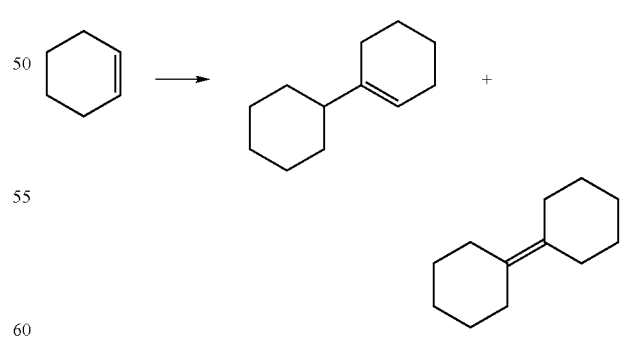

The invention claimed is:
1. A process for carrying out a chemical reaction which is catalysed by one or more metal fluoroalkylsulfonylated compound, which process comprises carrying out said reaction in the presence of an ionic liquid or in solvent-free conditions, and characterized in that the fluoroalkylsulfonylated compound is generated in situ.

2. A process according to claim 1 wherein the one or more metal fluoroalkylsulfonylated compound is a metal bistriflimide compound.

3. A process according to claim 2 wherein the bistriflimide compound has the following formula:

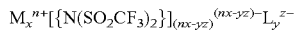

Where M is a metal;
L is a negative or neutral ligand
N is 2, 3, 4, 5, 6, 7 or 8
X is greater than or equal to 1;
Y is 0, 1, 2, 3, 4, 5, 6, 7 or 8; and
Z is 0, 1, 2, 3 or 4.

4. A process according to claim 3 wherein M is a metal selected from the metals in groups 1 to 16 and the lanthanides and the actinides.

5. A process according to claim 1 wherein the chemical reaction is one of:
    (a) an electrophillic substitution reaction, or
    (b) an isomerisation, polymerization or rearrangement of a chemical compound or molecule.

6. A process according to claim 5 wherein the chemical reaction is a reaction between an aromatic compound and an alkylating, acylating or sulfonating agent.

7. A process according to claim 5 wherein the chemical reaction is a rearrangement of esters of phenols to acyl phenols.

8. A process according to claim 1 wherein carrying out said reaction in solvent free conditions the comprises adding one or more hydrogen fluoroalkylsulfonylated compound directly to the reaction.

9. A process according to claim 1 wherein carrying out the reaction in the presence of an ionic liquid which comprises dissolving or suspending one or more hydrogen fluoroalkylsulfonylated compound in an ionic liquid.

10. A process according to claim 9 wherein the ionic liquid comprises a cation chosen from 1-alkylpyridinium or 1,3-dialkylimidazolium cation, alkyl- or poly-alkylpyridinium, alkyl or poly-alkylimidazolium, alkyl or poly-alkylpyrazolium, alkyl or poly-alkyl ammonium, alkyl or poly-alkyl phosphonium, and alkylated diazabicyclo-[5,4,0]-undec-7-ene; and an anion chosen from bis-trifluoromethanesulfonimide, bis-pentafluoroethanesulfonimide, hexafluorophosphate (V), tetrafluoroborate (III), trifluoromethanesulfonate, cyanamide, fluoro or perfluoroalkylsulfonate, halide, sulfate, hydrogensulfate, alkylsulfate, alkylsulfonate, arylsulfate, arylsulfonate, nitrate, carboxylate, phosphate, hydrogenphosphate, dihydrogenphosphate, alkylphosphate, alkylphosphonate, phosphonate, nitrite, arsenate, antimonate, haloaluminate, aluminate, borate, silicate, haloindate (III), gallate, alkylborate and halogallate.

11. A process according to claim 1 wherein the catalyst or the catalyst and ionic liquid combination are subsequently separated from the reaction mixture.

12. A process according to claim 11 wherein the catalyst or the catalyst and ionic liquid combination are subsequently recycled.

13. A process according to claim 2 wherein M is a metal selected from the metals in group 1 to 16 and the lanthanides and the actinides.

14. A process according to claim 3 wherein M is a metal selected from the metals in groups 1 to 16 and the lanthanides and the actinides.

15. A process according to claim 2 wherein the chemical reaction is one of:
    (a) an electrophillic substitution reaction, or
    (b) an isomerisation, polymerization or rearrangement of a chemical compound or molecule.

16. A process according to claim 3 wherein the chemical reaction is one of:
    (a) an electrophillic substitution reaction, or
    (b) an isomerisation, polymerization or rearrangement of a chemical compound or molecule.

17. A process according to claim 4 wherein the chemical reaction is one of:
    (a) an electrophillic substitution reaction, or
    (b) an isomerisation, polymerization or rearrangement of a chemical compound or molecule.

18. A process according to claim 2 wherein carrying out said reaction in solvent free conditions comprises adding one or more hydrogen fluoroalkylsulfonylated compound directly to the reaction.

19. A process according to claim 3 wherein carrying out said reaction in solvent free conditions comprises adding one or more hydrogen fluoroalkylsulfonylated compound directly to the reaction.

20. A process according to claim 4 wherein carrying out said reaction in solvent free conditions comprises adding one or more hydrogen fluoroalkylsulfonylated compound directly to the reaction.

21. A process according to claim 5 wherein carrying out said reaction in solvent free conditions comprises adding one or more hydrogen fluoroalkylsulfonylated compound directly to the reaction.

22. A process according to claim 6 wherein carrying out said reaction in solvent free conditions comprises adding one or more hydrogen fluoroalkylsulfonylated compound directly to the reaction.

23. A process according to claim 7 wherein carrying out said reaction in solvent free conditions comprises adding one or more hydrogen fluoroalkylsulfonylated compound directly to the reaction.

24. A process according to claim 2 wherein carrying out the reaction in the presence of an ionic liquid comprises dissolving or suspending one or more hydrogen fluoroalkylsulfonylated compound in an ionic liquid.

25. A process according to claim 3 wherein carrying out the reaction in the presence of an ionic liquid comprises dissolving or suspending one or more hydrogen fluoroalkylsulfonylated compound in an ionic liquid.

26. A process according to claim 4 wherein carrying out the reaction in the presence of an ionic liquid comprises dissolving or suspending one or more hydrogen fluoroalkylsulfonylated compound in an ionic liquid.

27. A process according to claim 5 wherein carrying out the reaction in the presence of an ionic liquid comprises dissolving or suspending one or more hydrogen fluoroalkylsulfonylated compound in an ionic liquid.

28. A process according to claim 6 wherein carrying out the reaction in the presence of an ionic liquid comprises dissolving or suspending one or more hydrogen fluoroalkylsulfonylated compound in an ionic liquid.

29. A process according to claim 7 wherein carrying out the reaction in the presence of an ionic liquid comprises dissolving or suspending one or more hydrogen fluoroalkylsulfonylated compound in an ionic liquid.

30. A process according to claim 2 wherein the catalyst or the catalyst and ionic liquid combination are subsequently separated from the reaction mixture.

31. A process according to claim 3 wherein the catalyst or the catalyst and ionic liquid combination are subsequently separated from the reaction mixture.

32. A process according to claim 4 wherein the catalyst or the catalyst and ionic liquid combination are subsequently separated from the reaction mixture.

33. A process according to claim 5 wherein the catalyst or the catalyst and ionic liquid combination are subsequently separated from the reaction mixture.

34. A process according to claim 6 wherein the catalyst or the catalyst and ionic liquid combination are subsequently separated from the reaction mixture.

35. A process according to claim 7 wherein the catalyst or the catalyst and ionic liquid combination are subsequently separated from the reaction mixture.

36. A process according to claim 8 wherein the catalyst or the catalyst and ionic liquid combination are subsequently separated from the reaction mixture.

37. A process according to claim 9 wherein the catalyst or the catalyst and ionic liquid combination are subsequently separated from the reaction mixture.

38. A process according to claim 10 wherein the catalyst or the catalyst and ionic liquid combination are subsequently separated from the reaction mixture.

39. A process according to claim 1, wherein the metal fluoroalkylsulfonylated compound is generated by addition of a metal or a metal compound to a source of $[N(SO_2C_xF_{(2x+1)})_2]^-$ anion.

40. A process according to claim 39 wherein the one or more metal fluoroalkylsulfonylated compound is a metal bistriflimide compound.

41. A process according to claim 40 wherein the source of bistriflimide ion is a bistriflimide ionic liquid.

42. A process according to claim 39 wherein the metal compound is a metal halide.

43. A process according to claim 2 wherein the source of bistriflimide ion is a bistriflimide ionic liquid.

* * * * *

UNITED STATES PATENT AND TRADEMARK OFFICE
CERTIFICATE OF CORRECTION

| | | |
|---|---|---|
| PATENT NO. | : 7,781,625 B2 | Page 1 of 1 |
| APPLICATION NO. | : 10/471259 | |
| DATED | : August 24, 2010 | |
| INVENTOR(S) | : Earle et al. | |

It is certified that error appears in the above-identified patent and that said Letters Patent is hereby corrected as shown below:

Title page, item (54) and Col. 1, the title of the invention should read:

--PROCESS CATALYSED BY BIS-TRIFLIMIDE COMPOUNDS--

Signed and Sealed this

Second Day of November, 2010

David J. Kappos
*Director of the United States Patent and Trademark Office*